United States Patent
Zhang et al.

(10) Patent No.: US 11,954,529 B2
(45) Date of Patent: Apr. 9, 2024

(54) METHOD, DEVICE AND COMPUTER PROGRAM PRODUCT FOR TRACKING LOCK

(71) Applicant: EMC IP Holding Company LLC, Hopkinton, MA (US)

(72) Inventors: Ming Zhang, Beijing (CN); Huan Chen, Beijing (CN); Chen Gong, Beijing (CN); Shuo Lv, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 929 days.

(21) Appl. No.: 16/937,891

(22) Filed: Jul. 24, 2020

(65) Prior Publication Data
US 2021/0318910 A1 Oct. 14, 2021

(30) Foreign Application Priority Data
Apr. 13, 2020 (CN) .......................... 202010286424.4

(51) Int. Cl.
*G06F 9/46* (2006.01)
*G06F 9/30* (2018.01)
*G06F 9/50* (2006.01)
*G06F 9/52* (2006.01)

(52) U.S. Cl.
CPC ........ *G06F 9/5027* (2013.01); *G06F 9/30047* (2013.01); *G06F 9/3009* (2013.01); *G06F 9/526* (2013.01); *G06F 2209/5011* (2013.01); *G06F 2209/508* (2013.01)

(58) Field of Classification Search
None
See application file for complete search history.

(56) References Cited

U.S. PATENT DOCUMENTS

| | | | |
|---|---|---|---|
| 5,884,022 A | 3/1999 | Callsen et al. | |
| 6,119,115 A | 9/2000 | Barr | |
| 6,173,442 B1* | 1/2001 | Agesen | G06F 9/52 717/162 |
| 9,158,597 B2 | 10/2015 | Ross | |
| 10,169,107 B2 | 1/2019 | Greco | |
| 11,126,474 B1 | 9/2021 | Zidenberg et al. | |
| 11,263,214 B2 | 3/2022 | Wei et al. | |
| 2002/0091995 A1 | 7/2002 | Arnold et al. | |

(Continued)

FOREIGN PATENT DOCUMENTS

| | | |
|---|---|---|
| CN | 1614555 A | 5/2005 |
| CN | 107479980 A | 12/2017 |
| CN | 109388537 A | 2/2019 |

OTHER PUBLICATIONS

2020102864244 Chinese Office Action Search Report dated Sep. 24, 2023; 3 pages.

*Primary Examiner* — Bing Zhao
(74) *Attorney, Agent, or Firm* — BainwoodHuang

(57) ABSTRACT

Techniques for tracking a lock involve creating an event comprising object information, and extracting the object information in the event through a thread in a thread pool. Such techniques further involve recording lock information comprising the object information according to a determination that the thread executes a lock operation. Such a lock tracking technique for a threading model can record lock information of an object when a thread performs locking and unlocking, and realize tracking of a lock operation and generating a lock analysis report.

20 Claims, 5 Drawing Sheets

(56) References Cited

U.S. PATENT DOCUMENTS

2003/0217092 A1* 11/2003 Veselov .................. G06F 9/52
718/104
2015/0205646 A1  7/2015 Singh
2018/0136986 A1  5/2018 Nguyen et al.

* cited by examiner

METHOD, DEVICE AND COMPUTER PROGRAM PRODUCT FOR TRACKING LOCK

CROSS-REFERENCE TO RELATED APPLICATION

This application claims priority to Chinese Patent Application No. CN202010286424.4, on file at the China National Intellectual Property Administration (CNIPA), having a filing date of Apr. 13, 2020, and having "METHOD, DEVICE AND COMPUTER PROGRAM PRODUCT FOR TRACKING LOCK" as a title, the contents and teachings of which are herein incorporated by reference in their entirety.

TECHNICAL FIELD

Embodiments of the present disclosure generally relate to the field of computer technologies, and in particular, to a method, a device, and a computer program product for tracking a lock.

BACKGROUND

In computer science, lock is a synchronization mechanism used for forcibly restricting resource access when multiple threads are executed. Through the lock mechanism, it can be ensured that only one thread enters code of a critical section at a certain time point in a multi-kernel multi-thread environment, thereby ensuring the consistency of operation data in the critical section.

Common locks include shared locks (SH locks) and exclusive locks (EX locks). If a thread adds a shared lock to an object, other threads cannot add an exclusive lock to the object, and all threads approved to share the lock can only read data, but cannot write data. If a thread adds an exclusive lock to an object, other threads cannot add any type of locks to the object, and the thread that obtains the exclusive lock can both read and write data.

SUMMARY OF THE INVENTION

A method, a device, and a computer program product for tracking a lock are provided in embodiments of the present disclosure.

In an aspect of the present disclosure, a method for tracking a lock is provided. The method includes creating an event including object information, and extracting the object information in the event through a thread in a thread pool. The method also includes recording lock information including the object information according to a determination that the thread executes a lock operation.

In another aspect of the present disclosure, an electronic device is provided. The device includes a processing unit and a memory, wherein the memory is coupled to the processing unit and stores instructions. When executed by the processing unit, the instructions perform the following actions: creating an event including object information; extracting the object information in the event through a thread in a thread pool; and recording lock information including the object information according to a determination that the thread executes a lock operation.

In another aspect of the present disclosure, a computer program product is provided. The computer program product is tangibly stored in a non-transitory computer-readable medium and includes machine-executable instructions, wherein when executed, the machine-executable instructions cause a computer to perform the method or process according to the embodiments of the present disclosure.

The summary is provided to introduce the choice of concepts in a simplified form, which will be further described in the following Detailed Description. The summary is neither intended to identify key features or major features of the present disclosure, nor intended to limit the scope of various embodiments of the present disclosure.

BRIEF DESCRIPTION OF THE DRAWINGS

The above and other objectives, features, and advantages of the present disclosure will become more apparent based on a more detailed description of example embodiments of the present disclosure with reference to the accompanying drawings, wherein in the example embodiments of the present disclosure, identical reference numerals generally represent identical components.

DETAILED DESCRIPTION

Figure 1:
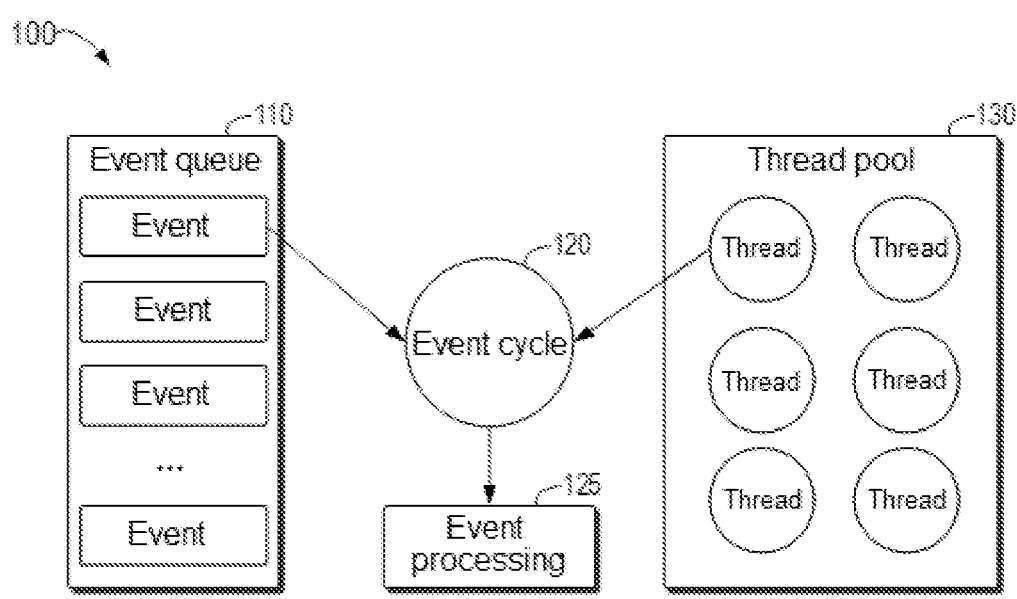
FIG. 1 is a schematic diagram of an example environment of a threading model.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although some specific embodiments of the present disclosure are shown in the accompanying drawings, it should be appreciated that the present disclosure can be implemented in various forms and should not be limited by the embodiments described here. In contrast, the embodiments are provided to make the present disclosure more thorough and complete, and the scope of the present disclosure can be fully conveyed to those skilled in the art.

The term "include" and its variants as used herein indicate open inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise explicitly indicated.

Unlike a conventional Linux thread-based working model, a threading model is object-based and event-driven. For example, threads can be fetched from a thread pool to execute events. Threads are the basic unit of independent scheduling and dispatching. In some cases, a thread may forget to unlock an object after locking it, or may lock the object twice. In addition, threads in a thread pool can process different objects. Therefore, tracking a lock operation of a threading model requires a special design, rather than merely recording threads and locks. However, there is no lock tracking mechanism for the threading model in conventional technologies.

Therefore, a lock tracking solution for a threading model is proposed in an embodiment of the present disclosure. The lock tracking solution for a threading model is proposed in the embodiment of the present disclosure, which can record lock information of an object when a thread performs locking and unlocking, thereby realizing tracking of a lock operation and generating an analysis report of the lock information.

Basic principles and several example implementations of the present disclosure are described below with reference to FIG. 1 to FIG. 8. It should be appreciated that these example embodiments are provided only to enable those skilled in the art to better understand and then implement the embodiments of the present disclosure, and are not intended to limit the scope of the present disclosure in any way.

FIG. 1 is a schematic diagram of example environment 100 of a threading model. As shown in FIG. 1, all requests and asynchronous operations can be put into event queue 110, and each request can be regarded as an event. A main thread finishes execution of ordinary code first, and then loops functions in an event queue in 120. If encountering an IO operation, it will take a thread from thread pool 130 and perform event processing in 125, for example, executing an IO operation, then execute a specified callback function after the operation is completed, place the completed event at the tail of the event queue, and continue the event loop. The embodiment of the present disclosure can track (or manage) lock operations of threads in thread pool 130, and record which object each thread locks and/or unlocks, respectively.

Figure 2:
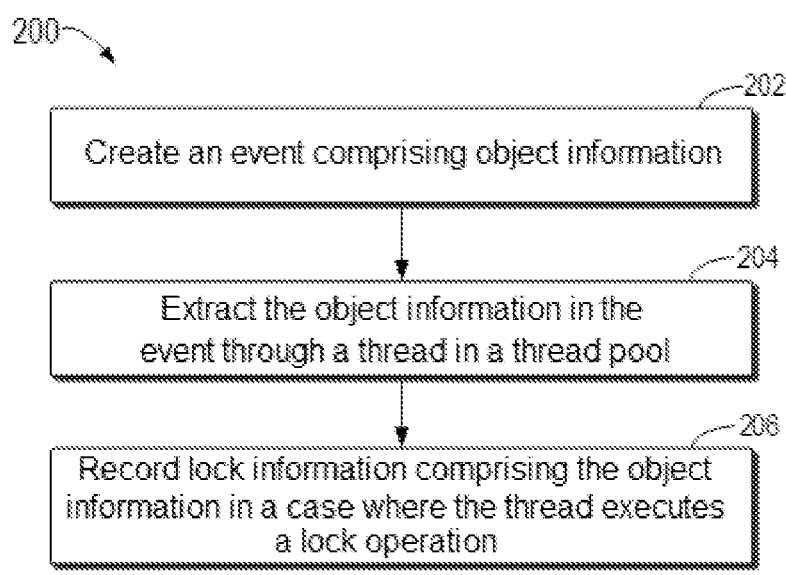
FIG. 2 is a flowchart of a method for tracking a lock according to an embodiment of the present disclosure.

FIG. 2 is a flowchart of method 200 for tracking a lock according to an embodiment of the present disclosure. In 202, an event including object information is created. For example, when an event is being created, an object address or an object identifier is embedded in the event. Therefore, the object address can be transferred to the event for use in subsequent recording.

In 204, the object information in the event is extracted by a thread in a thread pool. For example, when a thread is being obtained from the thread pool for processing the event, the object address is extracted from the event, and the object address is loaded to the thread. Therefore, the object address can be transferred from the event to the thread.

In 206, lock information including the object information is recorded according to a determination that the thread executes a lock operation. When the thread performs locking and/or unlocking, the lock operation of the thread on the object is recorded, and the lock information including the object address is recorded in a tracker repository for subsequent analysis.

Therefore, according to lock tracking method 200 for a threading model according to the embodiment of the present disclosure, lock information of the object can be recorded when the thread performs locking and unlocking, thereby implementing lock tracking and generating a lock analysis report.

Figure 3:
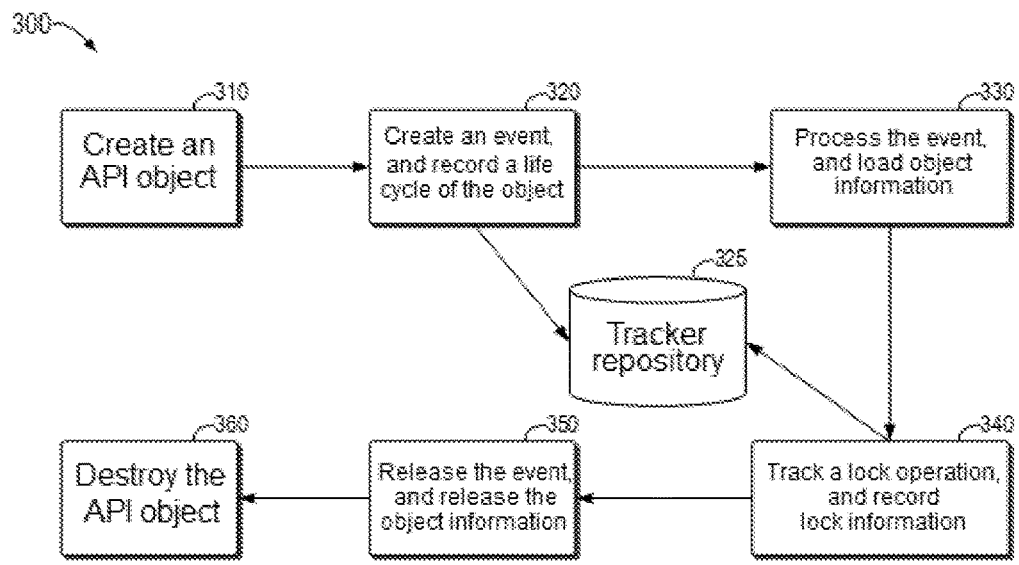
FIG. 3 is a schematic diagram of a process for recording lock information according to an embodiment of the present disclosure.

FIG. 3 is a schematic diagram of process 300 for recording lock information according to an embodiment of the present disclosure. As shown in FIG. 3, in 310, an application program interface (API) object is created. For example, the object may be an object or an operation in a file system. Optionally, an object address may be encrypted. In 320, an event in which object information (e.g., an object address) is embedded is created, and a life cycle of the object is recorded in tracker repository 325. In 330, a thread is obtained from a thread pool to process the event, and the thread loads the object information. In 340, when the thread executes a lock operation (such as locking and unlocking), the lock operation is tracked, and lock information including the object address is recorded in tracker repository 325. In an event-driven model, in 350, the event is released after the event is processed, and the thread releases the object information. In 360, the API object is destroyed. Therefore, the embodiment of the present disclosure can track and record the lock operation of the thread and the operation object when the thread is processing the event, which is helpful for subsequent lock information analysis.

Figure 4:
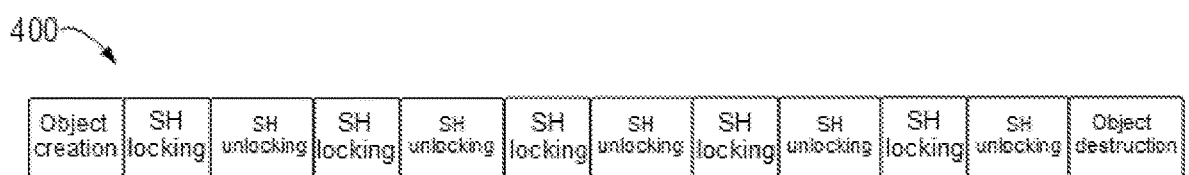
FIG. 4 is a schematic diagram of a lock information packet according to an embodiment of the present disclosure.

According to the embodiment of the present disclosure, when an event is being processed, a thread is caused to carry object information. During a life cycle of each event, object information can be transferred and exchanged between threads. When the thread executes a locking or unlocking operation, lock information will be recorded. The object's life cycle will also be recorded in tracker repository 325 as a start and end indication. For example, object lock information packet 400 can be generated for a life cycle of each object, as shown in FIG. 4. Packet 400 includes all locking and unlocking information for an object. After the object is destroyed, a tracking system will finally check a health status of the object.

Figure 5:
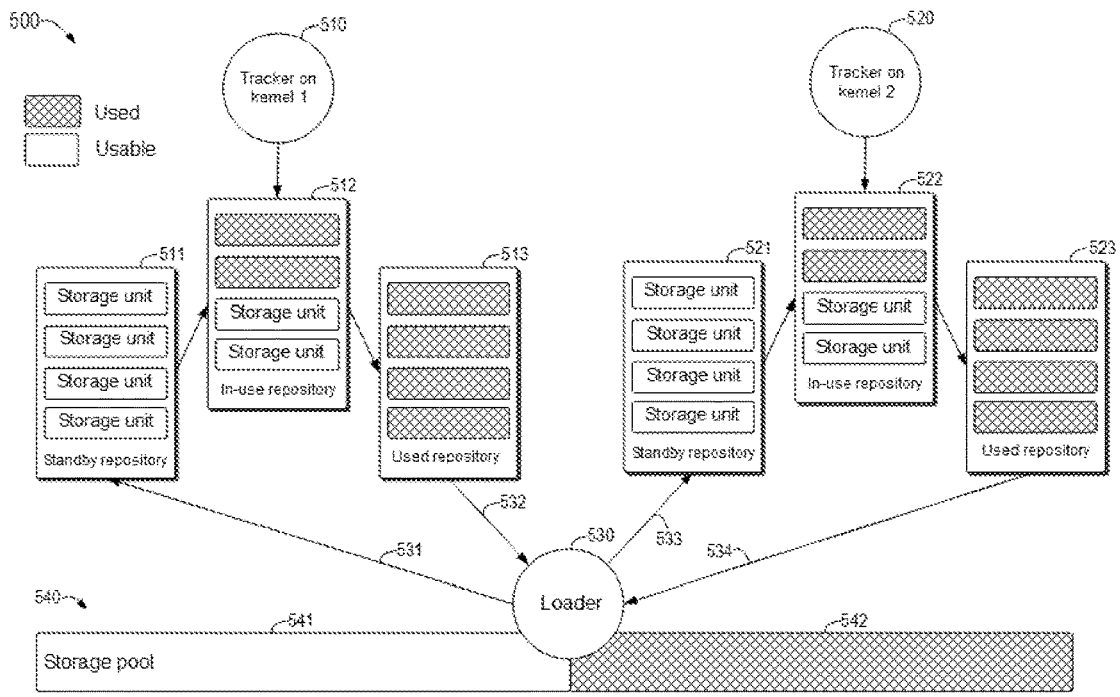
FIG. 5 is a schematic diagram of a buffer system for managing a storage pool according to an embodiment of the present disclosure.

FIG. 5 is a schematic diagram of buffer system 500 for managing a storage pool according to an embodiment of the present disclosure. As shown in FIG. 5, a plurality of trackers are running on a plurality of kernels, such as tracker 510 on kernel 1 and tracker 520 on kernel 2. An empty repository is retrieved from storage pool (magazine pool) 540 and a full repository is put into storage pool 540 through loader 530. Storage pool 540 includes usable part (referred to as "usable pool") 541 and used part (referred to as "used pool") 542. Storage pool 540 may be a part of a memory, the storage space in usable pool 541 may be allocated by loader 530 to trackers on various kernels for use, and lock information recorded from the trackers on the various kernels is cached in used pool 542.

Loader 530 processes used repositories and provides standby repositories. Referring to FIG. 5, loader 530 allocates standby repository (standby magazine) 511 from usable pool 541 to tracker 510 on kernel 1, as shown in 531, where standby repository 511 includes a plurality of storage units (bullets). Standby repository 511 turns into in-use repository 512 during use for tracker 510 to record lock information. FIG. 5 shows that the first two storage units in in-use repository 512 have recorded lock information, and the last two storage units have not recorded lock information. After in-use repository 512 is full, it turns into used repository 513 and is then transferred to loader 530, as shown in 532. Loader 530 then puts used repository 513 into used pool 542. Data in used pool 542 can be acquired by an analyzing module for analysis, and after the data is acquired by the analyzing module, the storage space in used pool 542 can be recovered.

Similarly, loader 530 allocates standby repository 521 from usable pool 541 to tracker 520 on kernel 2, as shown in 533, where standby repository 521 includes a plurality of storage units. Standby repository 521 turns into in-use repository 522 during use for tracker 520 to record lock information. FIG. 5 shows that the first two storage units in in-use repository 522 have recorded lock information, and the last two storage units have not recorded lock information. After in-use repository 522 is full, it turns into used repository 523 and is then transferred to loader 530, as shown in 534. Loader 530 then puts used repository 523 into used pool 542.

The embodiment of the present disclosure takes into account the performance of caching lock information, and uses a structure similar to a magazine and bullets in each kernel. When a thread stores tracking information in a kernel, it only needs to obtain storage units in a repository. In some embodiments, throttling can be used to control the time of loading the next standby repository. Two daemons can be created for caching management and analysis.

Figure 6:
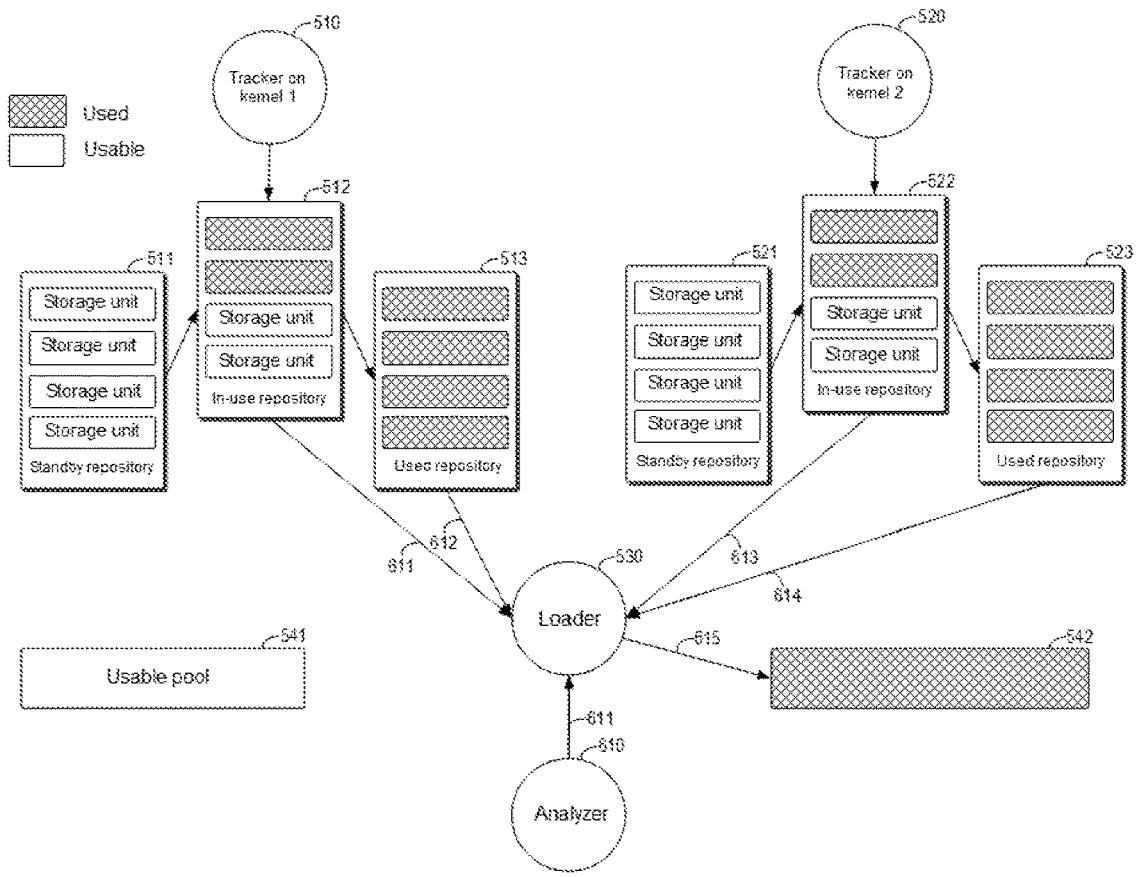
FIG. 6 is a schematic diagram of forcibly flushing lock information according to an embodiment of the present disclosure.

FIG. 6 is a schematic diagram of forcibly flushing lock information according to an embodiment of the present disclosure. As shown in FIG. 6, all lock information needs to be retrieved during analysis, including lock information in in-use repositories 512 and 522. Therefore, when loader 530 receives a forced flush command from analyzer 610, as shown in 611, loader 530 will forcibly retrieve all repositories on various kernels. For example, loader 530 transfers in-use repository 512 and used repository 513 of kernel 1 to used pool 542, as shown in 611, 612, and 615. In addition, loader 530 also transfers in-use repository 522 and used repository 523 of kernel 2 to used pool 542, as shown in 613, 614, and 615. In this way, when the analyzing module finds that there is still lock information in the in-use repository, it can send a forced flush signal, thereby solving the imbalance among the plurality of kernels.

In some embodiments, the utilization rate of storage pool 540 may be monitored, and if the utilization rate is greater than a predetermined threshold, a tracking system is switched to a bypass module. The bypass mode is a mode in which lock information is only recorded but not analyzed. That is, analysis is suspended because there's not enough time for analysis. This is for performance reasons, for example, in some situations with very high IO load. Loader 530 can switch the tracking system to the bypass mode through a "pause analysis" function, thereby quickly obtaining a usable storage space, and exit the bypass mode through a "resume analysis" function and perform normal caching management of the storage pool. By setting the bypass module, the tracking system can well cope with a scenario where storage resources are exhausted, thus improving the applicability of the tracking system.

Figure 7:
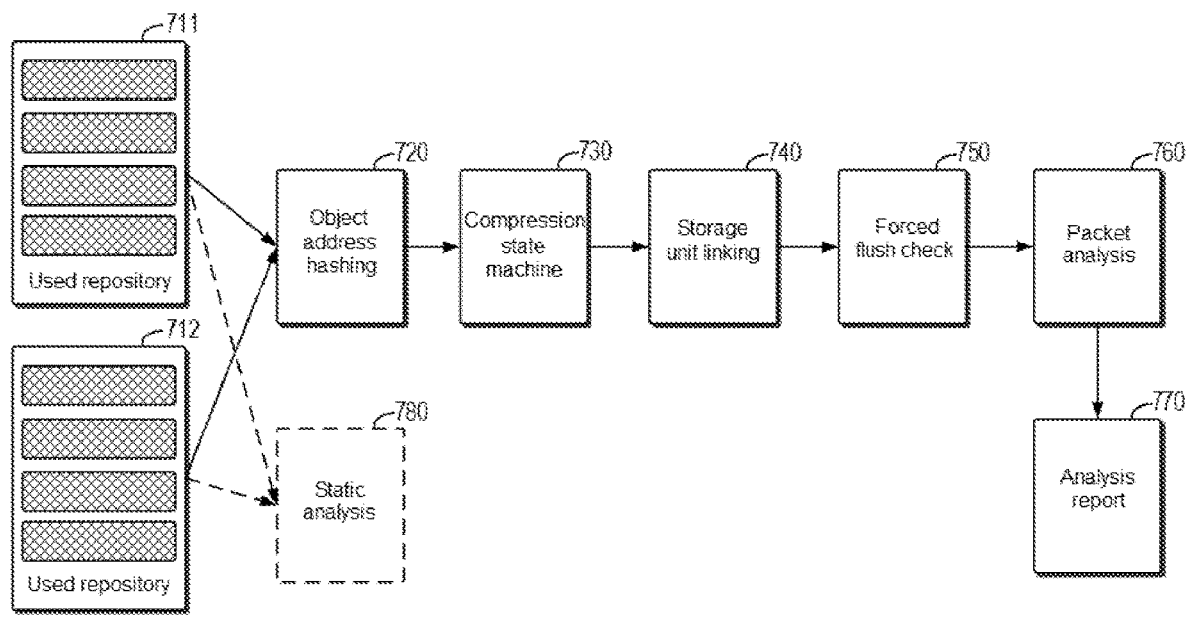
FIG. 7 is a schematic diagram of analyzing lock information according to an embodiment of the present disclosure.

FIG. 7 is a schematic diagram of analyzing lock information using an analyzing module according to an embodiment of the present disclosure. The analyzing module is a background program that recycles and analyzes used repositories. As shown in FIG. 7, after used repositories 711 and 712 (for example, used repositories 513 and 523 in FIG. 5 and FIG. 6) are obtained, storage units in used repositories 711 and 712 are assembled into packets. This is because the storage units may be scattered across kernels during storage.

In 720, the storage units are classified into a plurality of storage buckets by object address hashing, for example, by encrypting object addresses. Since there may be hash collisions, each repository may include lock information of one or more objects. This process is a preliminary, quick, and coarse classification. For example, a storage unit may include object information, lock address, CPU tag, lock operation type (such as locking and unlocking), and lock type (such as a shared lock and an exclusive lock). Next, in 730, for each storage bucket, a compression state machine (SM) is used to compress successive lock-unlock pairs to generate compressed object lock information. In this way, the lock information can be analyzed preliminarily, and various pairs of locks and unlocks that are clearly paired can be deleted, thereby reducing the quantity of pairs for further analysis. In 740, the plurality of storage buckets are further classified by storage unit linking, so that each storage bucket will include only one object address packet.

In 750, for each object address packet, a forced flush check may be performed to check, through an event tag of each kernel, whether there is still old lock information not retrieved, and if yes, loader 530 is notified to perform forced flushing, and the packet is used for next round of analysis.

In 760, final analysis is performed on the packet and analysis report 770 is generated. For example, a packet processor state machine may identify whether the packet is complete, a packet rule checker state machine is used to perform rule check, and a report indicating whether there is a lock abnormality at the object address is generated. For example, for object address X, a corresponding packet includes object creation, lock A locking, lock A unlocking, lock B locking, lock B unlocking, and object destruction. It is normal because the lock operations are paired. For another example, for object address Y, a corresponding packet includes object creation, lock C locking, lock C unlocking, lock D locking, and object destruction. It is abnormal since a lock D unlocking operation is missing. Therefore, the embodiment of the present disclosure can track lock information at runtime, thereby effectively discovering lock abnormalities.

Alternatively or additionally, in 780, static analysis may be performed on used repositories 711 and 712. For example, when the system crashes, recorded lock information is dumped, and static analysis is performed to find a lock abnormality.

An example of the tracking system is shown below. In the following example, "TYP: 2" indicates a shared lock, "ACT: 3" indicates that the lock operation is locking, and "S: 0" indicates that the lock lacks a peer (e.g., lacks corresponding unlocking). In addition to a lock address and an object address (encrypted 0x118131alfa9952b^789321845826628670x7f7d48ccbff8), a working context is also used, in which there are locking and unlocking of 3 shared locks in the stack.

Example stack:

---

8 0x00007f7eb452a500 in dart_fix_assert (e=0x7f7eb5c2bdab "0", file=0x7f7eb5c2c3a0 "../../../../../../../../../../sade/src/dart/Dart/server/src/cbfs/cbfs_operation.cxx", line=164) at ../../../../../../../../../../sade/src/dart/Dart/server/src/d2c/cbfs/d2c_panic_utils.c:52
9 0x00007f7eb4fec3ad in CBFS_APIObject::~CBFS_APIObject (this=0x7f7d48ccbff8, __in_chrg=<optimized out>) at ../../../../../../../../../../sade/src/dart/Dart/server/src/cbfs/cbfs_operation.cxx:164
10 0x00007f7eb5067859 in CBFS_APIObject_Mapping::~CBFS_APIObject_Mapping (this=0x7f7d48ccbff8, __in_chrg=<optimized out>) at ../../../../../../../../../../sade/src/dart/Dart/server/src/cbfs/cbfs_fileapiobj.hxx:2103

---

10

An example analysis report according to the embodiment of the disclosure:

---

1574846846.966787 7f7d979f88e0 KERNEL: 6: ===== TRS DUMPANA item 2 start ======
1574846846.966803 7f7d979f88e0 KERNEL: 6: DUMPANA OBJ:0x118131a1fa9952b LOCK0x0 TIME:78932184582662867 TYP:1 ACT:1 S:0
1574846846.966820 7f7d979f88e0 KERNEL: 6: DUMPANA OBJ:0x118131a1fa9952b LOCK:0x7f7cbd8b9b10 TIME:78932184583031721 TYP:2 ACT:3 S:1
1574846846.966836 7f7d979f88e0 KERNEL: 6: DUMPANA OBJ:0x118131a1fa9952b LOCK:0x7f7d90001460 TIME:78932184583130391 TYP:2 ACT:3 S:1
1574846846.966853 7f7d979f88e0 KERNEL: 6: DUMPANA OBJ:0x118131a1fa9952b LOCK:0x7f7cc29d7e80 TIME:78932184583361431 TYP:2 ACT:3 S:1
1574846846.966870 7f7d979f88e0 KERNEL: 6: DUMPANA OBJ:0x118131a1fa9952b LOCK:0x7f7cc29e1e40 TIME:78932184583475100 TYP:2 ACT:3 S:1
1574846846.966887 7f7d979f88e0 KERNEL: 6: DUMPANA OBJ:0x118131a1fa9952b LOCK:0x7f7cc29e1b70 TIME:78932184583697544 TYP:2 ACT:3 S:1
1574846846.966904 7f7d979f88e0 KERNEL: 6: DUMPANA OBJ:0x118131a1fa9952b LOCK:0x7f7cc29e1b70 TIME:78932184584882859 TYP:2 ACT:3 S:1
1574846846.966921 7f7d979f88e0 KERNEL: 6: DUMPANA OBJ:0x118131a1fa9952b LOCK:0x7f7cbd8b97a0 TIME:78932184584968766 TYP:2 ACT:3 S:1
1574846846.966938 7f7d979f88e0 KERNEL: 6: DUMPANA OBJ:0x118131a1fa9952b LOCK:0x7f7e90289098 TIME:78932184585334782 TYP:2 ACT:3 S:1
1574846846.966955 7f7d979f88e0 KERNEL: 6: DUMPANA OBJ:0x118131a1fa9952b LOCK:0x7f7cbd8b97a0 TIME:78932184585423580 TYP:2 ACT:4 S:1
1574846846.966972 7f7d979f88e0 KERNEL: 6: DUMPANA OBJ:0x118131a1fa9952b LOCK:0x7f7e90289098 TIME:78932184585486002 TYP:2 ACT:4 S:1
1574846846.966989 7f7d979f88e0 KERNEL: 6: DUMPANA OBJ:0x118131a1fa9952b LOCK:0x7f7cc29e1b70 TIME:78932184585907433 TYP:2 ACT:4 S:1
1574846846.967006 7f7d979f88e0 KERNEL: 6: DUMPANA OBJ:0x118131a1fa9952b LOCK:0x7f7cc29e1b70 TIME:78932184585980895 TYP:2 ACT:3 S:1
1574846846.967024 7f7d979f88e0 KERNEL: 6: DUMPANA OBJ:0x118131a1fa9952b LOCK:0x7f7cbd8b97a0 TIME:78932184586060625 TYP:2 ACT:3 S:1
1574846846.967042 7f7d979f88e0 KERNEL: 6: DUMPANA OBJ:0x118131a1fa9952b LOCK:0x7f7e90289098 TIME:78932184586179339 TYP:2 ACT:3 S:1
1574846846.967059 7f7d979f88e0 KERNEL: 6: DUMPANA OBJ:0x118131a1fa9952b LOCK:0x7f7cbd8b97a0 TIME:78932184586276672 TYP:2 ACT:4 S:1
1574846846.967076 7f7d979f88e0 KERNEL: 6: DUMPANA OBJ:0x118131a1fa9952b LOCK:0x7f7e90289098 TIME:78932184586341437 TYP:2 ACT:4 S:1
1574846846.967093 7f7d979f88e0 KERNEL: 6: DUMPANA OBJ:0x118131a1fa9952b LOCK:0x7f7cc29e1b70 TIME:78932184586656061 TYP:2 ACT:4 S:1
1574846846.967110 7f7d979f88e0 KERNEL: 6: DUMPANA OBJ:0x118131a1fa9952b LOCK:0x7f7cbd8b97a0 TIME:78932184589573096 TYP:2 ACT:3 S:1
1574846846.967127 7f7d979f88e0 KERNEL: 6: DUMPANA OBJ:0x118131a1fa9952b LOCK:0x7f7e90289098 TIME:78932184589674710 TYP:2 ACT:3 S:1
1574846846.967144 7f7d979f88e0 KERNEL: 6: DUMPANA OBJ:0x118131a1fa9952b LOCK:0x7f7cbd8b97a0 TIME:78932184589767176 TYP:2 ACT:4 S:1
1574846846.967161 7f7d979f88e0 KERNEL: 6: DUMPANA OBJ:0x118131a1fa9952b LOCK:0x7f7e90289098 TIME:78932184589829512 TYP:2 ACT:4 S:1
1574846846.967179 7f7d979f88e0 KERNEL: 6: DUMPANA OBJ:0x118131a1fa9952b LOCK:0x7f7e90289098 TIME:78932184589882057 TYP:2 ACT:3 S:1
1574846846.967197 7f7d979f88e0 KERNEL: 6: DUMPANA OBJ:0x118131a1fa9952b LOCK:0x7f7e90271af8 TIME:78932184619211647 TYP:2 ACT:3 S:1
1574846846.967221 7f7d979f88e0 KERNEL: 6: DUMPANA OBJ:0x118131a1fa9952b LOCK:0x7f7e32517fd0 TIME:78932184623720776 TYP:3 ACT:3 S:1
1574846846.967240 7f7d979f88e0 KERNEL: 6: DUMPANA OBJ:0x118131a1fa9952b LOCK:0x7f7e90271af8 TIME:78932184643289461 TYP:2 ACT:3 S:0
1574846846.967256 7f7d979f88e0 KERNEL: 6: DUMPANA OBJ:0x118131a1fa9952b LOCK:0x7f7e32517fd0 TIME:78932184645505014 TYP:3 ACT:4 S:1
1574846846.967273 7f7d979f88e0 KERNEL: 6: DUMPANA OBJ:0x118131a1fa9952b LOCK:0x7f7e90271af8 TIME:78932184645686288 TYP:2 ACT:4 S:1
1574846846.967290 7f7d979f88e0 KERNEL: 6: DUMPANA OBJ:0x118131a1fa9952b LOCK:0x7f7e90289098 TIME:78932184645861468 TYP:2 ACT:4 S:1
1574846846.967307 7f7d979f88e0 KERNEL: 6: DUMPANA OBJ:0x118131a1fa9952b LOCK:0x7f7cc29e1b70 TIME:78932184645933550 TYP:2 ACT:4 S:1
1574846846.967324 7f7d979f88e0 KERNEL: 6: DUMPANA OBJ:0x118131a1fa9952b LOCK:0x7f7cc29e1e40 TIME:78932184647246924 TYP:2 ACT:4 S:1
1574846846.967342 7f7d979f88e0 KERNEL: 6: DUMPANA OBJ:0x118131a1fa9952b LOCK:0x7f7cc29d7e80 TIME:78932184647296190 TYP:2 ACT:4 S:1

```
1574846846.967360 7f7d979f88e0 KERNEL: 6: DUMPANA OBJ:0x118131a1fa9952b LOCK:0x7f7d90001460 TIME:78932184647406952
TYP:2 ACT:4 S:1
1574846846.967377 7f7d979f88e0 KERNEL: 6: DUMPANA OBJ:0x118131a1fa9952b LOCK:0x7f7cbd8b9b10 TIME:78932184647461428
TYP:2 ACT:4 S:1
1574846846.967394 7f7d979f88e0 KERNEL: 6: DUMPANA OBJ:0x118131a1fa9952b LOCK0x0 TIME:78932184647648765 TYP:1 ACT:2 S:0
1574846846.967406 7f7d979f88e0 KERNEL: 6: ===== TRS DUMPANA item 2 end ======
```

According to the above analysis report, a lock "0x7f7e90271af8" that lacks unlocking can be quickly identified through "TYP: 2 ACT: 3 S: 0." Therefore, the embodiment of the present disclosure can track a lock for a threading model. Moreover, the above example analysis report is only an example of the present disclosure, and is not intended to limit the scope of the present disclosure.

In some embodiments, an electronic device is further provided in the embodiments of the disclosure. The device includes a processing unit and a memory, wherein the memory is coupled to the processing unit and stores instructions. When executed by the processing unit, the instructions create an event including object information, extract the object information in the event through a thread in a thread pool, and record lock information including the object information according to a determination that the thread executes a lock operation.

Figure 8:
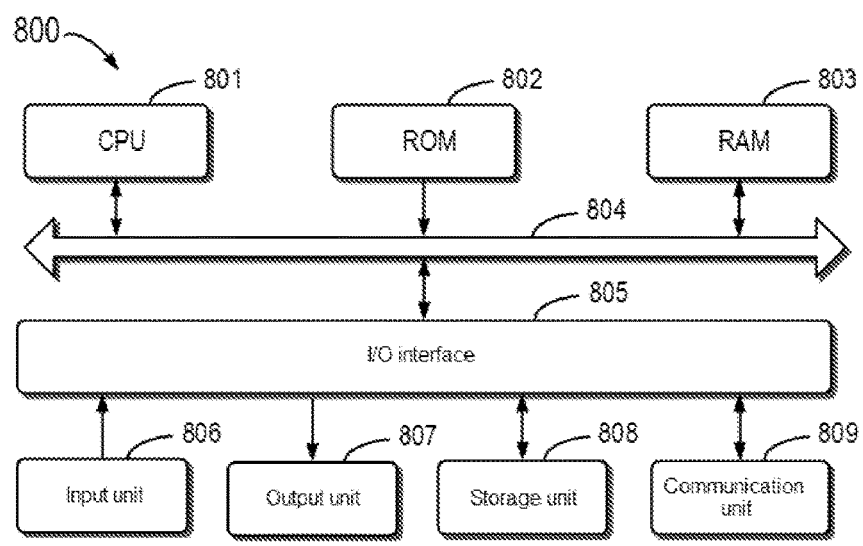
FIG. 8 is a schematic block diagram of an electronic device that can be configured to implement an embodiment of the present disclosure.

FIG. 8 is a schematic block diagram of device 800 that can be configured to implement an embodiment of the present disclosure. Device 800 may be the device or apparatus described in the embodiment of the present disclosure. As shown in FIG. 8, device 800 includes central processing unit (CPU) 801 that can perform various appropriate actions and processing according to computer program instructions stored in read-only memory (ROM) 802 or computer program instructions loaded from storage unit 808 to random access memory (RAM) 803. Various programs and data required for the operation of device 800 may also be stored in RAM 803. CPU 801, ROM 802, and RAM 803 are connected to each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices over a computer network such as the Internet and/or various telecommunication networks.

The various methods or processes described above may be performed by processing unit 801. For example, in some embodiments, the method can be implemented as a computer software program that is tangibly included in a machine-readable medium such as storage unit 808. In some embodiments, some or all of the computer program can be loaded and/or installed onto device 800 via ROM 802 and/or communication unit 809. When the computer program is loaded into RAM 803 and executed by CPU 801, one or more steps or actions of the methods or processes described above may be implemented.

In some embodiments, the methods and processes described above may be implemented as computer program products. The computer program product may include a computer-readable storage medium with computer-readable program instructions for performing various aspects of the present disclosure loaded therein.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium as used herein is not explained as transient signals themselves, such as radio waves or other electromagnetic waves propagated freely, electromagnetic waves propagated through waveguides or other transmission media (e.g., light pulses propagated through fiber-optic cables), or electrical signals transmitted over electrical wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages and conventional procedural programming languages. The computer-readable program instructions may be executed completely on a user's computer, executed partially on a user's computer, executed as a separate software package, executed partially on a user's computer and partially on a remote computer, or executed completely on a remote computer or a server. In the case where a remote computer is involved, the remote computer can be connected to a user's computer over any kind of networks, including a local area network (LAN) or a wide area network (WAN), or can be connected to an external computer (e.g., connected over the Internet using an Internet service provider). In some embodiments, an electronic circuit, such as a programmable logic circuit, a field programmable gate array (FPGA), or a programmable logic array (PLA), can be customized by utilizing state information of the computer-readable program instructions. The electronic circuit can execute the computer-readable program instructions to implement various aspects of the present disclosure.

The computer-readable program instructions can be provided to a processing unit of a general-purpose computer, a special-purpose computer, or another programmable data processing apparatus to produce a machine, such that the instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium, and the instructions cause a computer, a programmable data processing apparatus, and/or another device to work in a specific manner, such that the computer-readable medium storing the instructions includes an article of manufacture that includes instructions for implementing various aspects of functions/actions specified by one or more blocks in the flowcharts and/or block diagrams.

The computer-readable program instructions may also be loaded onto a computer, another programmable data processing apparatus, or another device, such that a series of operational steps are performed on the computer, another programmable data processing apparatus, or another device to produce a computer implemented process. As such, the instructions executed on the computer, another programmable data processing apparatus, or another device implement the functions/actions specified in one or more blocks in the flowcharts and/or block diagrams.

The flowcharts and block diagrams in the accompanying drawings illustrate architectures, functions, and operations of possible implementations of devices, methods, and computer program products according to multiple embodiments of the present disclosure. In this regard, each block in the flowcharts or block diagrams can represent a module, a program segment, or a portion of an instruction that includes one or more executable instructions for implementing specified logical functions. In some alternative implementations, functions labeled in the blocks may occur in an order different from that labeled in the accompanying drawings. For example, two successive blocks may actually be performed basically in parallel, or they can be performed in an opposite order sometimes, depending on the functions involved. It should also be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various embodiments of the present disclosure have been described above, and the foregoing description is illustrative rather than exhaustive, and is not limited to the disclosed embodiments. Numerous modifications and changes are apparent to those of ordinary skill in the art without departing from the scope and spirit of the illustrated various embodiments. The selection of terms as used herein is intended to best explain the principles and practical applications of the various embodiments or the technical improvements to technologies on the market, or to enable other persons of ordinary skill in the art to understand the embodiments disclosed here.

The invention claimed is:

1. A method for tracking a lock which restricts access to a computerized resource of a computerized apparatus having limited storage resources, comprising:
    placing an event into an event queue of the computerized apparatus, the event comprising object information;
    extracting the object information in the event through a thread in a thread pool;
    recording lock information comprising the object information according to a determination that the thread executes a lock operation which operates a lock on the computerized resource of the computerized apparatus;
    monitoring a utilization rate of a storage pool of the computerized apparatus;
    determining whether the utilization rate is greater than a predetermined threshold; and
    switching, according to a determination that the utilization rate is greater than the predetermined threshold, a tracking system to a bypass mode in which the lock information is recorded but not analyzed;
    wherein recording the lock information comprises:
        distributing a standby repository from a usable pool in the storage pool to a kernel, the standby repository comprising a plurality of storage units for recording lock information;
        recording the lock information in the standby repository to form a used repository; and
        transferring the used repository from the kernel to a used pool in the storage pool.

2. The method of claim 1, wherein the object information comprises an object address, and
    wherein recording the lock information comprising the object information further comprises:
        generating an object lock information packet for a life cycle of an object, the packet comprising creation information and locking and unlocking information of the object, as well as destruction information of the object.

3. The method of claim 1, further comprising:
    receiving a forced flush command for analysis; and
    transferring in-use repositories and used repositories of a plurality of kernels to the used pool.

4. The method of claim 1, further comprising:
    obtaining a plurality of used repositories recording the lock information;
    analyzing the lock information in the plurality of used repositories; and
    recycling the plurality of used repositories to the usable pool in the storage pool.

5. The method of claim 4, wherein analyzing the lock information in the plurality of used repositories comprises:
    classifying, based on a hash of an object address, the lock information in the plurality of used repositories into a plurality of storage buckets;
    compressing each of the plurality of storage buckets; and
    further classifying the plurality of compressed storage buckets, so that each storage bucket comprises an object address packet.

6. The method of claim 5, wherein analyzing the lock information in the plurality of used repositories further comprises:
  checking the integrity of each object address packet; and
  generating an analysis report of each object address packet, the analysis report indicating whether there is a lock abnormality.

7. The method of claim 1, wherein extracting the object information in the event through the thread comprises:
  reading the object information from the event and loading the object information in the thread.

8. An electronic device, comprising:
  a processing unit; and
  a memory coupled to the processing unit and storing instructions, wherein when executed by the processing unit, the instructions perform the following actions:
    placing an event into an event queue of the electronic device, the event comprising object information;
    extracting the object information in the event through a thread in a thread pool;
    recording lock information comprising the object information according to a determination that the thread executes a lock operation which operates a lock on a computerized resource of the electronic device;
    monitoring a utilization rate of a storage pool of the electronic device;
    determining whether the utilization rate is greater than a predetermined threshold; and
    switching, according to a determination that the utilization rate is greater than the predetermined threshold, a tracking system to a bypass mode in which the lock information is recorded but not analyzed;
  wherein recording the lock information comprises:
    distributing a standby repository from a usable pool in the storage pool to a kernel, the standby repository comprising a plurality of storage units for recording lock information;
    recording the lock information in the standby repository to form a used repository; and
    transferring the used repository from the kernel to a used pool in the storage pool.

9. The device of claim 8, wherein the object information comprises an object address, and
  wherein recording the lock information comprising the object information further comprises:
    generating an object lock information packet for a life cycle of an object, the packet comprising creation information and locking and unlocking information of the object, as well as destruction information of the object.

10. The device of claim 8, wherein the actions further comprise:
  receiving a forced flush command for analysis; and
  transferring in-use repositories and used repositories of a plurality of kernels to the used pool.

11. The device of claim 8, wherein the actions further comprise:
  obtaining a plurality of used repositories recording the lock information;
  analyzing the lock information in the plurality of used repositories; and
  recycling the plurality of used repositories to the usable pool in the storage pool.

12. The device of claim 11, wherein analyzing the lock information in the plurality of used repositories comprises:
  classifying, based on a hash of an object address, the lock information in the plurality of used repositories into a plurality of storage buckets;
  compressing each of the plurality of storage buckets; and
  further classifying the plurality of compressed storage buckets, so that each storage bucket comprises an object address packet.

13. The device of claim 12, wherein analyzing the lock information in the plurality of used repositories further comprises:
  checking the integrity of each object address packet; and
  generating an analysis report of each object address packet, the analysis report indicating whether there is a lock abnormality.

14. A computer program product having a non-transitory computer readable medium which stores a set of instructions to track a lock which restricts access to a computerized resource of a computerized apparatus having limited storage resources; the set of instructions, when carried out by computerized circuitry, causing the computerized circuitry to perform a method of:
  placing an event into an event queue of the computerized apparatus, the event comprising object information;
  extracting the object information in the event through a thread in a thread pool;
  recording lock information comprising the object information according to a determination that the thread executes a lock operation which operates a lock on the computerized resource of the computerized apparatus;
  monitoring a utilization rate of a storage pool of the computerized apparatus;
  determining whether the utilization rate is greater than a predetermined threshold; and
  switching, according to a determination that the utilization rate is greater than the predetermined threshold, a tracking system to a bypass mode in which the lock information is recorded but not analyzed;
  wherein recording the lock information comprises:
    distributing a standby repository from a usable pool in the storage pool to a kernel, the standby repository comprising a plurality of storage units for recording lock information;
    recording the lock information in the standby repository to form a used repository; and
    transferring the used repository from the kernel to a used pool in the storage pool.

15. The computer program product of claim 14, wherein the object information comprises an object address, and
  wherein recording the lock information comprising the object information further comprises:
    generating an object lock information packet for a life cycle of an object, the packet comprising creation information and locking and unlocking information of the object, as well as destruction information of the object.

16. The computer program product of claim 14, further comprising:
  receiving a forced flush command for analysis; and
  transferring in-use repositories and used repositories of a plurality of kernels to the used pool.

17. The computer program product of claim 14, further comprising:
  obtaining a plurality of used repositories recording the lock information;

analyzing the lock information in the plurality of used repositories; and recycling the plurality of used repositories to the usable pool in the storage pool.

18. The computer program product of claim 17, wherein analyzing the lock information in the plurality of used repositories comprises:

classifying, based on a hash of an object address, the lock information in the plurality of used repositories into a plurality of storage buckets;

compressing each of the plurality of storage buckets; and further classifying the plurality of compressed storage buckets, so that each storage bucket comprises an object address packet.

19. The computer program product of claim 18, wherein analyzing the lock information in the plurality of used repositories further comprises:

checking the integrity of each object address packet; and generating an analysis report of each object address packet, the analysis report indicating whether there is a lock abnormality.

20. A method for tracking a lock which restricts access to a computerized resource of a computerized apparatus having limited storage resources, comprising:

placing an event into an event queue of the computerized apparatus, the event comprising object information;

extracting the object information in the event through a thread in a thread pool; and recording lock information comprising the object information according to a determination that the thread executes a lock operation;

obtaining a plurality of used repositories recording the lock information;

analyzing the lock information in the plurality of used repositories; and recycling the plurality of used repositories to a usable pool in a storage pool;

wherein analyzing the lock information in the plurality of used repositories comprises:

classifying, based on a hash of an object address, the lock information in the plurality of used repositories into a plurality of storage buckets;

compressing each of the plurality of storage buckets to generate a plurality of compressed storage buckets that removes at least part of the lock information from subsequent processing when analyzing the lock information and that frees storage space of the plurality of used repositories to recycle to the usable pool in the storage pool; and further classifying the plurality of compressed storage buckets, so that each storage bucket comprises an object address packet.

* * * * *